US011221510B2

(12) United States Patent
Wang et al.

(10) Patent No.: US 11,221,510 B2
(45) Date of Patent: Jan. 11, 2022

(54) MOVABLE ELECTRODE STRUCTURE AND LIQUID CRYSTAL LENS

(71) Applicant: BOE TECHNOLOGY GROUP CO., LTD., Beijing (CN)

(72) Inventors: Zhidong Wang, Beijing (CN); Lijia Zhou, Beijing (CN); Junrui Zhang, Beijing (CN); Rongjian Yan, Beijing (CN); Quanguo Zhou, Beijing (CN); Li Tian, Beijing (CN); Ronghua Lan, Beijing (CN); Xuehui Zhu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 232 days.

(21) Appl. No.: 16/413,084

(22) Filed: May 15, 2019

(65) Prior Publication Data
US 2020/0064685 A1 Feb. 27, 2020

(30) Foreign Application Priority Data

Aug. 21, 2018 (CN) .......................... 201810956152.7

(51) Int. Cl.
G02F 1/1335 (2006.01)
G02F 1/1337 (2006.01)
G02F 1/1343 (2006.01)
(52) U.S. Cl.
CPC ...... *G02F 1/133526* (2013.01); *G02F 1/1337* (2013.01); *G02F 1/1343* (2013.01)

(58) Field of Classification Search
None
See application file for complete search history.

(56) References Cited

U.S. PATENT DOCUMENTS

| 2005/0133698 | A1 | 6/2005 | Oniki et al. |
| 2006/0056001 | A1 | 3/2006 | Taguchi et al. |
| 2006/0087388 | A1 | 4/2006 | Kawai et al. |
| 2008/0174532 | A1* | 7/2008 | Lewis ............... G09G 3/3466 345/85 |
| 2012/0300167 | A1 | 11/2012 | You et al. |
| 2013/0201437 | A1 | 8/2013 | Choi et al. |

FOREIGN PATENT DOCUMENTS

| CN | 1627178 A | 6/2005 |
| CN | 1743892 A | 3/2006 |
| CN | 1812189 A | 8/2006 |

OTHER PUBLICATIONS

Office action issued in Chinese Application No. 201810956152.7, dated Aug. 7, 2020, 11 pages.

* cited by examiner

*Primary Examiner* — Thanh Nhan P Nguyen
(74) *Attorney, Agent, or Firm* — Dave Law Group LLC; Raj S. Dave

(57) ABSTRACT

Embodiments of the present disclosure relate to a movable electrode structure and a liquid crystal lens. The movable electrode structure includes: a substrate; a support on the substrate; a first beam having elasticity and attached to the support; an electrode attached to the first beam; and an opposing member located on the substrate and at least partially facing the first beam.

11 Claims, 3 Drawing Sheets

Figure 2:
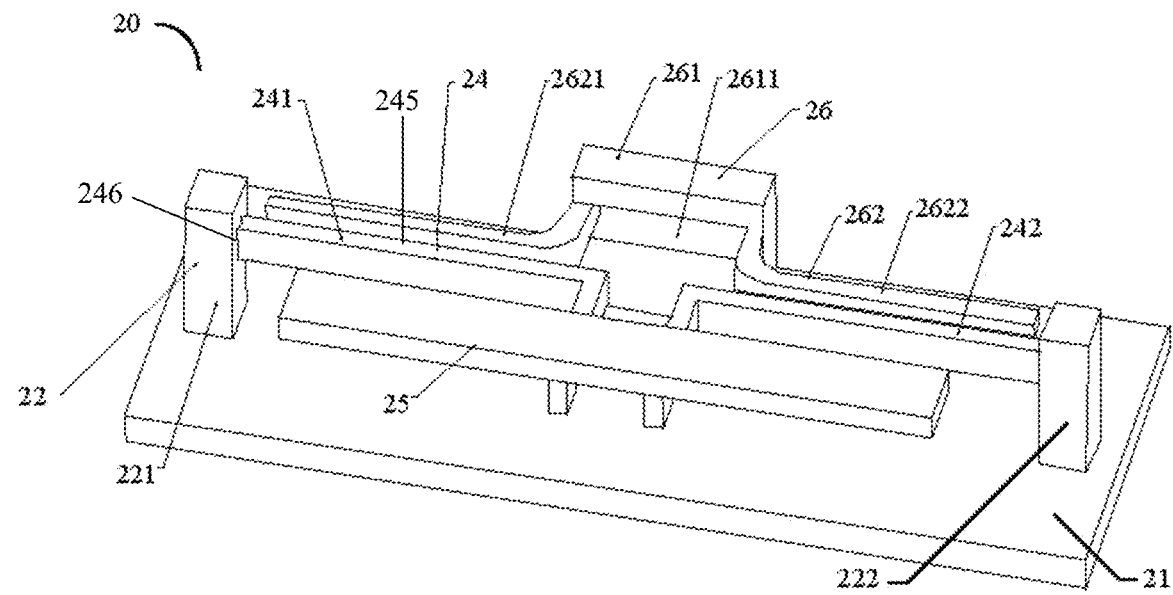

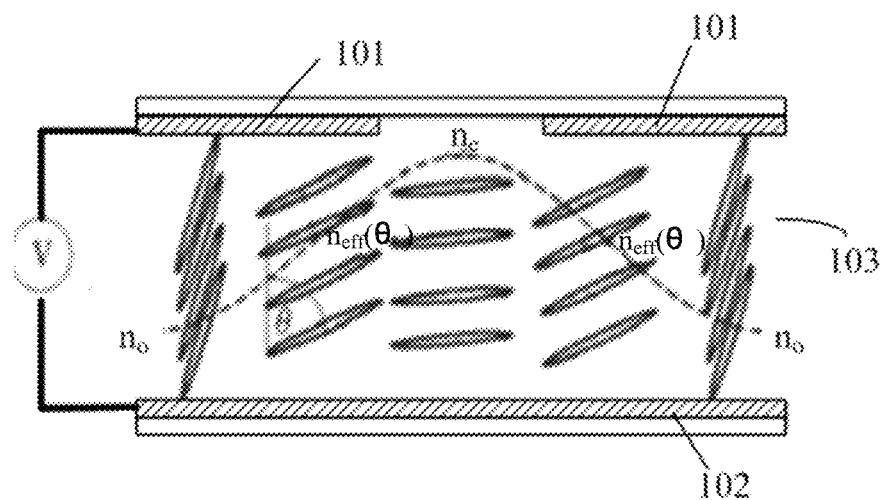
FIG. 1A -- Prior Art --
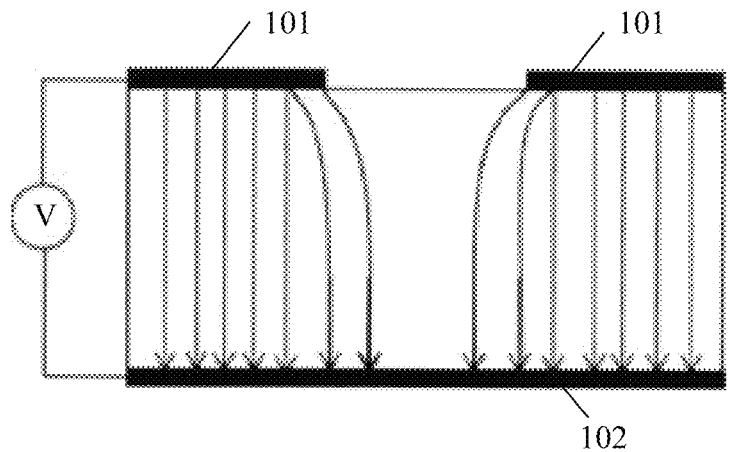
FIG. 1B -- Prior Art --

MOVABLE ELECTRODE STRUCTURE AND LIQUID CRYSTAL LENS

CROSS REFERENCE TO RELATED APPLICATION

This application claims the benefit and priority of Chinese Patent Application No. 201810956152.7 filed Aug. 21, 2018. The entire disclosure of the above application is incorporated herein by reference.

FIELD

The present disclosure relates to the field of lens technologies, and in particular, to a movable electrode structure and a liquid crystal lens.

BACKGROUND

This section provides background information related to the present disclosure which is not necessarily prior art.

Liquid crystals may be divided into two categories. If the component of a dielectric tensor along the molecular axis (i.e., the optical axis) is greater than the component perpendicular to that axis, such a liquid crystal is called a positive dielectric anisotropic liquid crystal, and its molecular alignment is parallel to the direction of the electric field applied thereto; otherwise, it is called a negative dielectric anisotropic liquid crystal and its molecular alignment is perpendicular to the direction of the electric field applied thereto. A liquid crystal element, regardless of which type, has a light condensing effect similar to that of an optical lens in the case where an appropriate voltage is applied. Such an optical element having a light condensing effect formed by using liquid crystals is called a liquid crystal lens.

SUMMARY

This section provides a general summary of the disclosure, and is not a comprehensive disclosure of its full scope or all of its features.

In an aspect of the present disclosure, a movable electrode structure is provided. The movable electrode structure includes: a substrate; a support on the substrate; a first beam having elasticity and attached to the support; an electrode attached to the first beam; and an opposing member located on the substrate and at least partially facing the first beam.

In an exemplary embodiment, the opposing member includes a support portion on the substrate and a second beam attached to the support portion, the second beam being at least partially opposite to the first beam.

In an exemplary embodiment, the support includes a first support and a second support spaced from each other, the first beam including a first beam section attached to the first support and a second beam section attached to the second support.

In an exemplary embodiment, the second beam includes a third beam section and a fourth beam section attached to the support portion. The third beam section is at least partially opposite to the first beam section, and the fourth beam section is at least partially opposite to the second beam section.

In an exemplary embodiment, the support portion has holes for securing the third beam section and the fourth beam section.

In an exemplary embodiment, one end of the third beam section and one end of the fourth beam section are secured into the holes, and the other end of the third beam section and the other end of the fourth beam section are free ends.

In an exemplary embodiment, both the first beam section and the second beam section have a L shape.

In an exemplary embodiment, a surface of the first beam to which the electrode is attached is perpendicular to a surface of the first beam attached the support.

In an exemplary embodiment, the first beam is movable in a direction toward or away from the opposing member based on a Coulomb force between the first beam and the opposing member.

In another aspect of the present disclosure, a liquid crystal lens is provided. The liquid crystal lens includes: a first electrode structure; a second electrode structure disposed opposite to the first electrode structure; and a liquid crystal layer between the first electrode structure and the second electrode structure. The second electrode structure includes a movable electrode structure as described in one or more embodiments above or below.

In an exemplary embodiment, the liquid crystal lens further includes a control mechanism configured to generate a Coulomb force between the first beam and the opposing member such that the first beam is movable in a direction toward or away from the opposing member under the Coulomb force.

In an exemplary embodiment, the second electrode structure includes two movable electrode structures spaced apart from each other.

In an exemplary embodiment, the control mechanism is further configured such that the electrodes of said two movable electrode structures move toward or away from each other.

In an exemplary embodiment, the electrodes of said two movable electrode structures are made of a light shielding material.

In an exemplary embodiment, the first electrode structure includes: a first substrate; and a first electrode on a side of the first substrate adjacent to the liquid crystal layer. In an exemplary embodiment, the liquid crystal lens further includes: a first alignment layer on a side of the first electrode adjacent to the liquid crystal layer; and a second alignment layer on a side of the substrate of the second electrode structure adjacent to the liquid crystal layer.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 3:
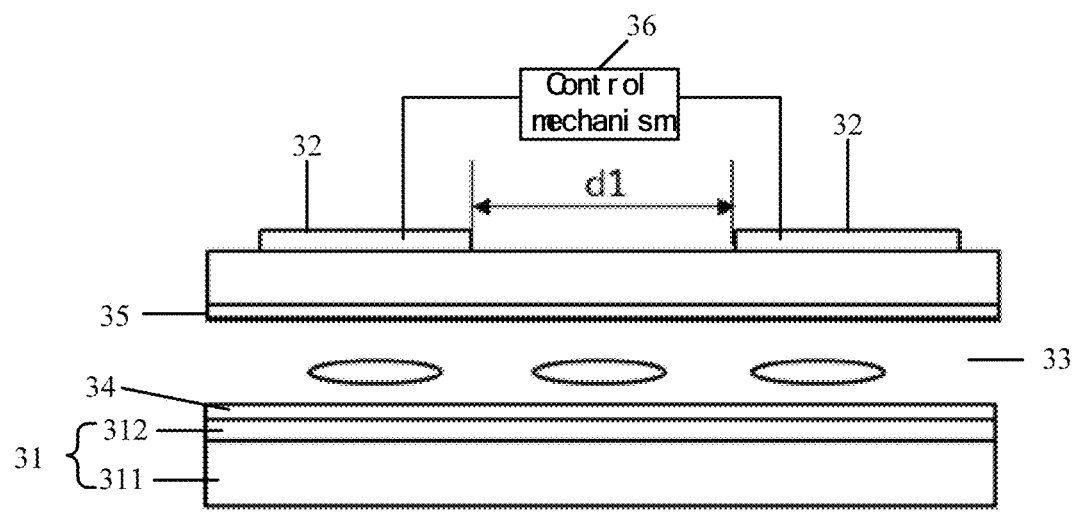
Figure 4:
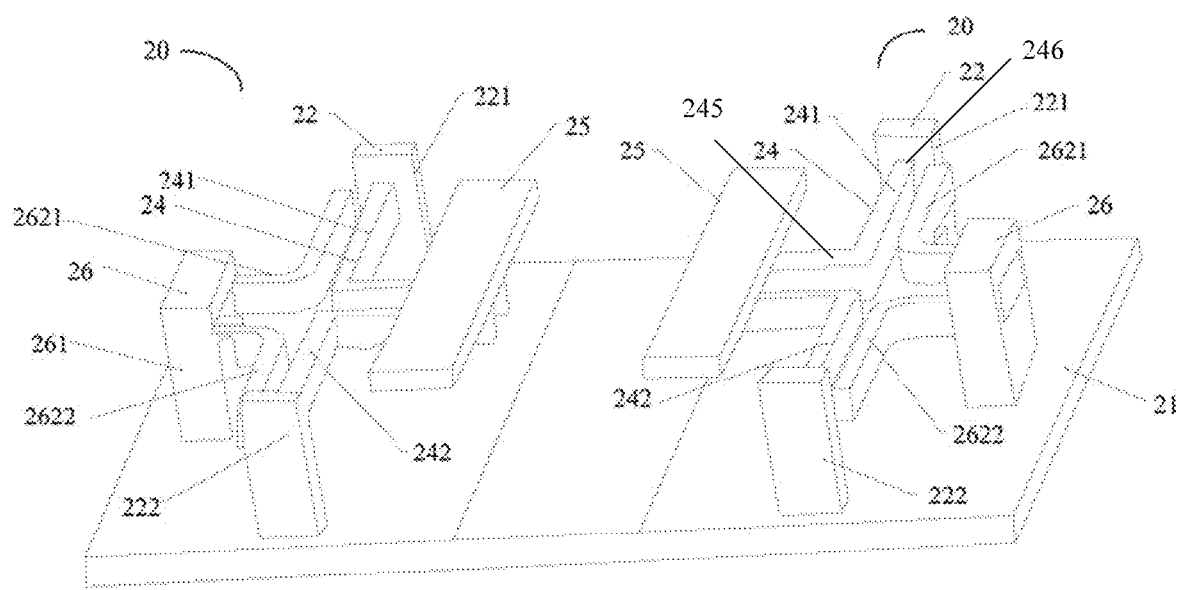
Figure 5:
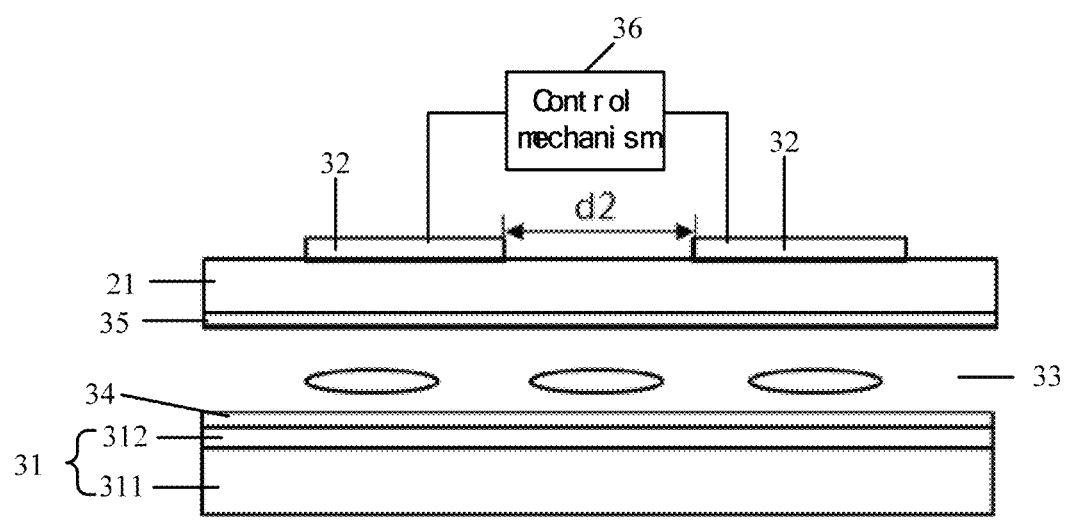

FIG. 1A and FIG. 1B schematically illustrate an example liquid crystal lens in the related art and an electric field distribution in the liquid crystal lens, respectively;

FIG. 2 schematically illustrates a movable electrode structure in some embodiments of the present disclosure;

FIG. 3 illustrates a schematic diagram of a liquid crystal lens in some embodiments of the present disclosure;

FIG. 4 schematically illustrates a second electrode structure of the liquid crystal lens in the embodiment shown in FIG. 3; and FIG. 5 illustrates a schematic view of a decrease in the spacing between the electrodes of the two movable electrode structures of the liquid crystal lens in the embodiment shown in FIG. 3.

Corresponding reference numerals indicate corresponding parts or features throughout the several views of the drawings.

DETAILED DESCRIPTION

Various embodiments will now be described in detail with reference to the drawings, which are provided as illustrative examples of the disclosure so as to enable those skilled in the art to practice the invention. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

When describing elements of the present disclosure and embodiments thereof, the articles "a", "an", "the", and "said" are intended to indicate the presence of one or more elements; unless otherwise stated, the meaning of "a plurality of" indicates two or more; the terms "comprise", "include", "contain" and "have" are intended to be inclusive and mean that there may be additional elements in addition to those listed; the terms "first" "second", "third", etc. are used for the purpose of description only, and are not to be construed as indicating or implying relative importance and the order of formation.

Example embodiments will now be described more fully with reference to the accompany drawings.

FIG. 1A and FIG. 1B schematically illustrate an example liquid crystal lens in the related art and an electric field distribution in the liquid crystal lens, respectively. As shown in FIG. 1A, in the related art, the liquid crystal lens includes two upper electrodes 101 spaced apart from each other, a lower electrode 102, and a liquid crystal layer 103, for example, a liquid crystal cell, located between the upper electrodes 101 and the lower electrode 102. By applying an appropriate voltage V between the upper electrodes 101 and the lower electrode 102, an electric field as shown in FIG. 1B may be generated in the liquid crystal layer 103, such that liquid crystals in the liquid crystal layer 103 have a gradient-distributed refractive index shown in FIG. 1A, under the action of the electric field. In FIG. 1A, $n_o$ represents the refractive index of ordinary light; $n_e$ represents the refractive index of extraordinary light; and $n_{eff}(\theta)$ represents the equivalent refractive index when the angle between the long axis of liquid crystal molecules and the vertical direction is $\theta$, and $n_{eff}(\theta)$ may vary between $n_o$ and $n_e$. Such a liquid crystal layer having a gradient-distributed refractive index may have a light condensing effect similar to that of an optical lens, and thus may be used as a lens.

However, as shown in FIG. 1A, the two upper electrodes 101 are usually attached to the upper substrate, and the spacing between the two upper electrodes 101 is fixed, whereby the luminous flux passing through such a liquid crystal lens cannot be changed. If it is necessary to adjust the luminous flux passing through the liquid crystal lens, it is necessary to arrange an additional diaphragm on the liquid crystal lens, which inevitably increases the complexity of the structure and causes inconvenience in operation.

In a first aspect of the present disclosure, a movable electrode structure is provided. The electrode of the movable electrode structure may be used as at least one of the upper electrodes of the liquid crystal lens, and the luminous flux passing through the liquid crystal lens may be conveniently adjusted by changing the position of the electrode in the movable electrode structure.

FIG. 2 schematically illustrates a movable electrode structure in some embodiments of the present disclosure. As shown in FIG. 2, the movable electrode structure includes a substrate 21, a support 22 (e.g., a supporting pillar) on the substrate 21, a first beam 24 having elasticity and attached to the support 22, an electrode 25 attached to the first beam 24, and an opposing member 26 located on the substrate 21 and at least partially facing the first beam 24.

In some embodiments of the present disclosure, the first beam 24 is movable in a direction toward or away from the opposing member 26 based on a Coulomb force between the first beam 24 and the opposing member 26.

In an exemplary embodiment, electrostatic charges of the same polarity, such as positive charges, may be applied to the first beam 24 and the opposing member 26 such that the first beam 24 and the opposing member 26 generate mutual repulsive forces under the action of the electrostatic charges. Since the first beam 24 is elastic, which has elasticity, the first beam 24 is elastically deformed under the action of the repulsive force of the opposing member 26 so as to drive the electrode attached thereto to move away from the opposing member. Similarly, positive charges may be applied to the first beam 24 and negative charges may be applied to the opposing member 26 such that the first beam 24 and the opposing member 26 generate an attractive force under the action of the charges of different polarity. Under the attractive force of the opposing member 26, the first beam 24 may drive the electrode 25 attached thereto to move toward the opposing member 26.

In embodiments of the present disclosure, electrostatic charges may be applied to the first beam 24 and the opposing member 26 in any manner known. As a non-limiting example, electrostatic charges may be provided by applying a voltage to the first beam 24 and the opposing member 26 or by friction electrification.

In the case where such a movable electrode structure is applied to a liquid crystal lens, particularly as at least one upper electrode of the liquid crystal lens, the luminous flux passing through the liquid crystal lens may be easily and reliably changed. In addition, the movable electrode structure may be realized by a MEMS (Micro-Electro-Mechanical-System) technology, which is easy to implement and will not cause structural redundancy of the liquid crystal lens.

In an embodiment of the present disclosure, a surface 245 of the first beam 24 to which the electrode 25 is attached is perpendicular to a surface 246 of the first beam 24 attached to the support 22.

As shown in FIG. 2, the support 22 may include a first support 221 and a second support 222 that are spaced apart from each other. The first beam 24 may include a first beam section 241 and a second beam section 242 that are attached to the first support 221 and the second support 222, respectively. For example, one end of the first beam section 241 may be secured to the first support 221, and the other end of the first beam section 241 is located below the electrode 25 to support the electrode 25; one end of the second beam section 242 is attached to the second support 222, and the other end of the second beam section 242 is also located below the electrode 25 to support the electrode 25 together with the other end of the first beam section 241. In an exemplary embodiment, the first beam section 241 and the second beam section 242 may both have an L shape.

As shown in FIG. 2, the opposing member 26 may include a support portion 261 on the substrate 21 and a second beam 262 attached to the support portion 261. The second beam 262 is at least partially opposite to the first beam 24. In this case, electrostatic charges may be applied to the first beam 24 and the second beam 262 to generate a Coulomb force that is capable of driving the first beam 24 to move toward or away from the second beam 262.

In an exemplary embodiment, the second beam 262 may include a third beam section 2621 and a fourth beam section 2622 attached to the support portion 261. The third beam section 2621 and the fourth beam section 2622 are at least partially opposite to the first beam section 241 and the second beam section 242, respectively. With this configuration, in the case where electrostatic charges are applied to the first beam section 241, the second beam section 242, the third beam section 2621, and the fourth beam section 2622, an interacting Coulomb force may be generated between the first beam section 241 and the third beam section 2621 such that the first beam section 241 generates a deformation under the Coulomb force between the first beam section 241 and the third beam section 2621; an interacting Coulomb force may also be generated between the second beam section 242 and the fourth beam section 2622 such that the second beam section 242 generates a deformation under the Coulomb force between the second beam section 242 and the fourth beam section 2622. Thus, the first beam section 241 and the second beam section 242 may drive the electrodes attached thereto to move toward or away from the second beam 262.

In an exemplary embodiment, the support portion 261 may also have holes 2611 for fixing the third beam section 2621 and the fourth beam section 2622. One end of the third beam section 2621 and one end of the fourth beam section 2622 are inserted and fixed into the holes 2611, and the other end of the third beam section 2621 and the other end of the fourth beam section 2622 may be free ends. It may be understood that the other end of the third beam section 2621 and the other end of the fourth beam section 2622 may also be fixed ends, for example, respectively, secured to additional supports different from the first support 221 and the second support 222. Alternatively, the third beam section 2621 and the fourth beam section 2622 may also have a L shape.

To illustrate the particular effects, advantages, and feasibility of the present disclosure, the L shape is used herein as an exemplary shape of the first beam section 241, the second beam section 242, the third beam section 2621, and the fourth beam section 2622 which representation is, however, not intended to limit the scope of the present disclosure to this particular shape of the first beam section 241, the second beam section 242, the third beam section 2621, and the fourth beam section 2622. By virtue of this example, one skilled in the art may rather easily recognize how to adapt the related structures or conditions when employing different shapes.

In another aspect of the present disclosure, a liquid crystal lens is provided. Optionally, the liquid crystal lens may make use of at least one movable electrode structure according to the present disclosure, such as of a movable electrode structure according to one or more embodiments disclosed in detail above. Thus, for alternative embodiments of the liquid crystal lens, reference may be made to the embodiments of the movable electrode structure. In an embodiment of the liquid crystal lens, the luminous flux passing through the liquid crystal lens may be conveniently adjusted by controlling the position of the electrode in the movable electrode structure.

FIG. 3 illustrates a schematic diagram of a liquid crystal lens in some embodiments of the present disclosure. As shown in FIG. 3, the liquid crystal lens may include a first electrode structure 31, two second electrode structures 32 spaced apart from each other and disposed opposite to the first electrode structure 31, and a liquid crystal layer 33 between the first electrode structure 31 and the second electrode structures 32. In an example implementation, at least one of the two second electrode structures 32 may use the movable electrode structure 20 in one or more embodiments disclosed above in detail.

In the embodiment shown in FIG. 3, both of the second electrode structures 32 make use of the movable electrode structure 20. However, it will be appreciated that only one of the two second electrode structures 32 may make use of the movable electrode structure 20 while the other second electrode structure is immovable, which may also achieve the object of the present disclosure.

FIG. 4 schematically illustrates a second electrode structure of the liquid crystal lens in the embodiment shown in FIG. 3. As shown in FIG. 4, the second electrode structure has two movable electrode structures 20, which may share the same substrate 21. In the case where the two movable electrode structures 20 are assembled to the liquid crystal lens, a surface of the substrate where the electrode 25 is not disposed may face the liquid crystal layer.

In an exemplary embodiment, the liquid crystal lens may further include a control mechanism 36 configured to generate a Coulomb force between the first beam 24 and the opposing member 26 of the movable electrode structure such that the first beam 24 may move toward or away from the opposing member 26 under the action of the Coulomb force.

In the case where both of the second electrode structures of the liquid crystal lens make use of a movable electrode structure, the control mechanism 36 is configured such that the electrodes 25 of the two movable electrode structures move toward or away from each other. The luminous flux of the liquid crystal lens may be conveniently controlled by moving the electrodes 25 of the two movable electrode structures.

In an exemplary embodiment, the control mechanism 36 may apply electrostatic charges of the same polarity, such as positive charges, to the first beam and the opposing member of the first movable electrode structure of the two movable electrode structures such that a mutually repulsive Coulomb force may be generated between the first beam and the opposing member of the first movable electrode structure under the action of the electrostatic charges. Under the action of the Coulomb force of the opposing member of the first movable electrode structure, the first beam of the first movable electrode structure may generate elastical deformation to drive the electrode attached thereto to move toward a direction away from the opposing member. Similarly, the control mechanism may apply electrostatic charges of the same polarity to the first beam and the opposing member of the second movable electrode structure of the two movable electrode structures such that the first beam of the second movable electrode structure may generate elastical deformation under the action of the Coulomb force of the opposing member to drive the electrode attached thereto to move toward the direction away from the opposing member of the second movable electrode structure. Therefore, the electrode of the first movable electrode structure and the electrode of the second movable electrode structure may be moved toward each other such that the spacing therebetween is reduced, whereby the luminous flux of the liquid crystal lens may be adjusted. Referring to FIG. 3, the spacing between the two electrodes is d1 before the electrodes of the two movable electrode structures are moved. The electrodes of the two movable electrode structures may be moved toward each other by the control mechanism controlling the Coulomb force between the first beam and the opposing member of the movable electrode structure. Referring to FIG. 5, the spacing between the two electrodes after movement becomes d2, where d2 is less than d1. Similarly, the electrodes of the two movable electrode structures may be moved away from each other by the control of the control mechanism, such that the luminous flux of the liquid crystal lens may be increased.

In some embodiments of the present disclosure, the electrodes in the two movable electrode structures are made of a light shielding material. The luminous flux passing through the liquid crystal lens may be controlled by controlling the spacing between the electrodes of the two movable electrode structures.

In an exemplary embodiment, the first electrode structure 31 may include a first substrate 311 and a first electrode 312 on a side of the first substrate 311 adjacent to the liquid crystal layer 33. The liquid crystal lens further includes a first alignment layer 34 on a side of the first electrode 312 adjacent to the liquid crystal layer, and a second alignment layer 35 on a side of the substrate 21 of the second electrode structure 32 adjacent to the liquid crystal layer 33.

In some embodiments of the present disclosure, the functions of the control mechanism, including any functional blocks described as "interfaces" or "engines", may be provided by using dedicated hardware and hardware capable of executing software in conjunction with appropriate software. When provided by the processor, the functions may be provided by a single dedicated processor, provided by a single shared processor or provided by a plurality of separate processors, some of which may be shared. In addition, the explicit use of the term "processor" or "engine" should not be construed as an exclusive reference to hardware capable of executing software, but may implicitly include, but is not limited to, digital signal processor (DSP) hardware, a network processor, an application specific integrated circuit (ASIC), a field programmable gate array (FPGA), a read only memory (ROM) for storing software, a random access memory (RAM), and a nonvolatile storage device. It can also include other conventional and/or customized hardware.

The foregoing description of the embodiments has been provided for purpose of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are included within the scope of the disclosure.

The invention claimed is:

1. A liquid crystal lens, comprising:
   a first electrode structure;
   a second electrode structure disposed opposite to the first electrode structure; and
   a liquid crystal layer between the first electrode structure and the second electrode structure,
   wherein the second electrode structure comprises a movable electrode structure,
   wherein, the movable electrode structure comprises: a substrate; a support on the substrate; a first beam having elasticity and attached to the support; an electrode attached to the first beam; and an opposing member located on the substrate and at least partially facing the first beam.

2. The liquid crystal lens according to claim 1, further comprising a control mechanism configured to generate a Coulomb force between the first beam and the opposing member such that the first beam is movable in a direction toward or away from the opposing member under the Coulomb force.

3. The liquid crystal lens according to claim 2, wherein the second electrode structure comprises two movable electrode structures spaced apart from each other.

4. The liquid crystal lens according to claim 3, wherein the control mechanism is further configured such that the electrodes of said two movable electrode structures move toward or away from each other.

5. The liquid crystal lens according to claim 4, wherein the electrodes of said two movable electrode structures are made of a light shielding material.

6. The liquid crystal lens according to claim 1, wherein the first electrode structure comprises:
   a first substrate; and
   a first electrode on a side of the first substrate adjacent to the liquid crystal layer,
   wherein the liquid crystal lens further comprises:
   a first alignment layer on a side of the first electrode adjacent to the liquid crystal layer; and
   a second alignment layer on a side of the substrate of the second electrode structure adjacent to the liquid crystal layer.

7. The liquid crystal lens according to claim 1, wherein the opposing member comprises a support portion on the substrate and a second beam attached to the support portion, the second beam being at least partially opposite to the first beam.

8. The liquid crystal lens according to claim 7, wherein the support comprises a first support and a second support spaced from each other, the first beam comprising a first beam section attached to the first support and a second beam section attached to the second support.

9. The liquid crystal lens according to claim 8, wherein the second beam comprises a third beam section and a fourth beam section attached to the support portion, the third beam section being at least partially opposite to the first beam section, the fourth beam section being at least partially opposite to the second beam section.

10. The liquid crystal lens according to claim 9, wherein the support portion has holes for fixing the third beam section and the fourth beam section.

11. The liquid crystal lens according to claim 10, wherein one end of the third beam section and one end of the fourth beam section are fixed into the holes, and the other end of the third beam section and the other end of the fourth beam section are free ends.

* * * * *